(12) United States Patent
Sun et al.

(10) Patent No.: US 9,300,159 B2
(45) Date of Patent: Mar. 29, 2016

(54) CHARGING METHOD FOR A RECHARGEABLE BATTERY AND CHARGING ARCHITECTURE THEREWITH

(71) Applicant: Industrial Technology Research Institute, Hsinchu (TW)

(72) Inventors: Chein-Chung Sun, Kaohsiung (TW);
Shou-Hung Ling, Taipei (TW);
Chiu-Yu Liu, Kaohsiung (TW);
Ying-Hao Hsu, Kaohsiung (TW);
Heng-Hui Tu, New Taipei (TW);
Chung-Jen Chou, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 530 days.

(21) Appl. No.: 13/916,592

(22) Filed: Jun. 13, 2013

(65) Prior Publication Data

US 2014/0167706 A1 Jun. 19, 2014

(30) Foreign Application Priority Data

Dec. 13, 2012 (TW) .............................. 101147278 A

(51) Int. Cl.
*H02J 7/00* (2006.01)

(52) U.S. Cl.
CPC ............. *H02J 7/0083* (2013.01); *H02J 7/0081* (2013.01)

(58) Field of Classification Search
CPC ....................................................... H02J 7/007
USPC ....................................................... 320/160
See application file for complete search history.

(56) References Cited

U.S. PATENT DOCUMENTS

| 6,060,865 A | 5/2000 | Chen |
| 6,275,009 B1 | 8/2001 | Sakakibara et al. |

(Continued)

FOREIGN PATENT DOCUMENTS

| CN | 1055262 | 10/1991 |
| CN | 101471582 | 7/2009 |

(Continued)

OTHER PUBLICATIONS

Liu et al., "Search for an Optimal Rapid Charging Pattern for Lithium-Ion Batteries Using Ant Colony System Algorithm," IEEE Transactions on Industrial Electronics 52 (5), Oct. 2005, pp. 1328-1336.

(Continued)

*Primary Examiner* — Edward Tso
*Assistant Examiner* — Ahmed Omar
(74) *Attorney, Agent, or Firm* — Jianq Chyun IP Office

(57) ABSTRACT

A charging method for a rechargeable battery and a related charging architecture are provided. The provided charging method includes following steps. A characteristic curve of the rechargeable battery related to charge cycle vs. a residual capacity of a non-constant voltage charging stage under a warranty life limitation is provided. An expected residual capacity corresponding to a condition when a terminal voltage of the rechargeable battery reaches a limited charge voltage is found from the characteristic curve related to the charge cycle vs. the residual capacity of the non-constant voltage charging stage by using a current charge cycle count of the rechargeable battery. A real residual capacity corresponding to a condition when the terminal voltage of the rechargeable battery reaches the limited charge voltage approaches to the expected residual capacity by adjusting a charging current of the rechargeable battery.

21 Claims, 5 Drawing Sheets

(56) References Cited

U.S. PATENT DOCUMENTS

| | | |
|---|---|---|
| 6,337,560 B1 | 1/2002 | Kalogeropoulos et al. |
| 6,512,984 B1 | 1/2003 | Suzuki et al. |
| 6,583,606 B2 | 6/2003 | Koike et al. |
| 7,282,891 B2 | 10/2007 | Smallwood et al. |
| 2001/0006338 A1 | 7/2001 | Yamashita |
| 2001/0010456 A1 | 8/2001 | Kaite et al. |
| 2008/0007223 A1 | 1/2008 | Morioka |
| 2009/0224689 A1 | 9/2009 | Yang |
| 2009/0243549 A1 | 10/2009 | Matsumura et al. |
| 2010/0194339 A1 | 8/2010 | Yang et al. |
| 2011/0012563 A1 | 1/2011 | Paryani et al. |
| 2011/0037439 A1 | 2/2011 | Bhardwaj et al. |
| 2011/0109273 A1 | 5/2011 | Tamezane |
| 2011/0241623 A1 | 10/2011 | Wade et al. |
| 2011/0260689 A1* | 10/2011 | Kano .............. H02J 7/0022 320/128 |
| 2012/0049804 A1* | 3/2012 | Kobayashi ........ H01M 10/441 320/150 |

FOREIGN PATENT DOCUMENTS

| | | |
|---|---|---|
| CN | 102447283 | 5/2012 |
| EP | 0711016 B1 | 5/1996 |
| JP | 2010035327 | 2/2010 |
| TW | 347598 | 12/1998 |
| TW | 408509 | 10/2000 |
| TW | 468300 | 12/2001 |
| TW | 535308 | 6/2003 |
| TW | I253774 | 4/2006 |
| TW | I279573 | 4/2007 |
| TW | I296458 | 5/2008 |
| TW | 200903948 | 1/2009 |
| TW | I348802 | 9/2011 |

OTHER PUBLICATIONS

Klein et al., "Optimal Charging Strategies in Lithium-Ion Battery," American Control Conference, Jun. 29-Jul. 1, 2011, pp. 382-387.

* cited by examiner

US 9,300,159 B2

CHARGING METHOD FOR A RECHARGEABLE BATTERY AND CHARGING ARCHITECTURE THEREWITH

CROSS-REFERENCE TO RELATED APPLICATION

This application claims the priority benefit of Taiwan application serial no. 101147278, filed on Dec. 13, 2012. The entirety of the above-mentioned patent application is hereby incorporated by reference herein and made a part of this specification.

TECHNICAL FIELD

The disclosure relates to a charging method for a rechargeable battery and a related charging architecture.

BACKGROUND

Presently, in order to shorten a charging time when a rechargeable battery, a simplest method is to increase a charging current/rate. However, this kind of methods will accelerate aging speed of the rechargeable battery, which results in reducing fully charged capacity (FCC) of the rechargeable battery, increasing the internal resistance and unsatisfying the warranty life. The so-called FCC of the rechargeable battery means that the capacity when battery is fully charged. In general, the battery aging phenomenon includes the capacity degradation and internal resistance increase. To decelerate the aging speed of the rechargeable battery, a general method is to preload a setting table of battery temperatures vs. charging currents, battery temperatures vs. battery charging voltages or the likes when charging the battery. For example, the charging current can be calculated by using current status. However, the error of this kind of look-up table methods will increase when battery is aging and its characteristic has been changed. In addition, such methods are still unable to attain the balance between the charging time and the warranty life. Therefore, it is an important issue in this field to find the optimal solution between the battery lifespan and quick charging time.

SUMMARY

An exemplary embodiment of the disclosure provides a charging method of a rechargeable battery, which includes following steps. A characteristic curve of the rechargeable battery related to charge cycle vs. a residual capacity of a non-constant voltage charging stage under a warranty life limitation is provided. The residual capacity is also called as remaining capacity. An expected residual capacity corresponding to a condition when a terminal voltage of the rechargeable battery reaches a limited charge voltage is found from the characteristic curve related to the charge cycle vs. the residual capacity of the non-constant voltage charging stage by using a current charge cycle count of the rechargeable battery. A real residual capacity corresponding to a condition when the terminal voltage of the rechargeable battery reaches the limited charge voltage approaches to the expected residual capacity by adjusting a charging current of the rechargeable battery.

Another exemplary embodiment of the disclosure provides a charging architecture including an electric energy supplying device and a terminal device. The terminal device includes a rechargeable battery and a battery management module. The battery management module is connected to and communicates with the electric energy supplying device, and the battery management module records a characteristic curve of the rechargeable battery related to a charge cycle vs. a residual capacity of a non-constant voltage charging stage under a warranty life limitation, finds an expected residual capacity corresponding to a condition when a terminal voltage of the rechargeable battery reaches a limited charge voltage from the characteristic curve related to the charge cycle vs. the residual capacity of the non-constant voltage charging stage by using a current charge cycle count of the rechargeable battery, and adjusts a charging current of the rechargeable battery to make a real residual capacity corresponding to a condition when the terminal voltage of the rechargeable battery reaches the limited charge voltage to approach to the expected residual capacity.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
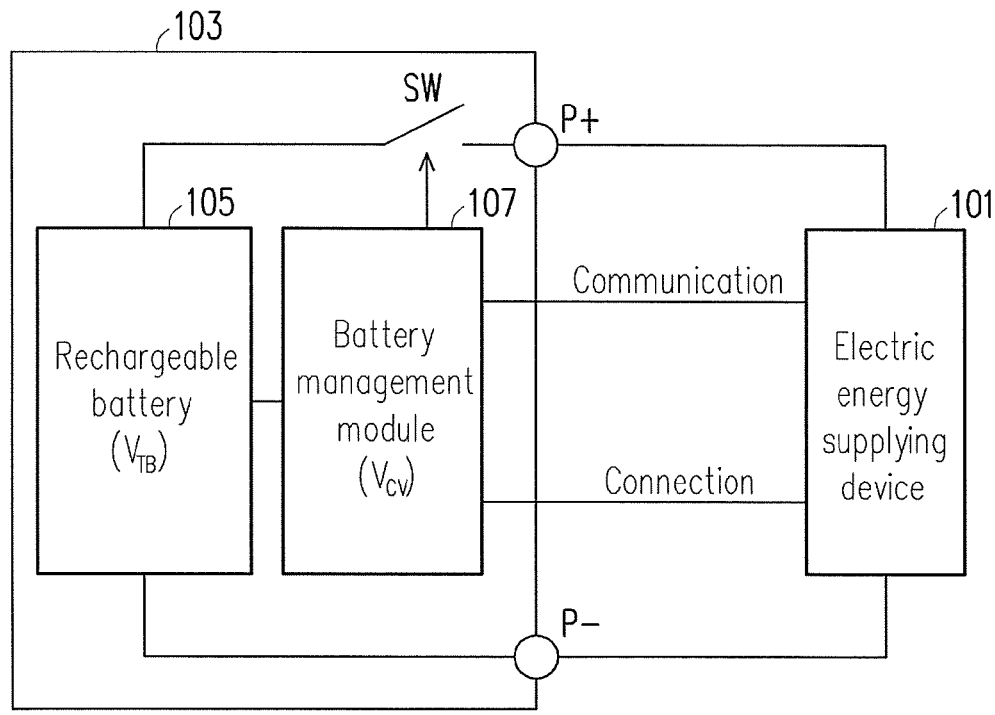
FIG. 1 is a schematic diagram of a charging architecture according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

It is well known that high charging speed will shorten the charging time but it will damage the materials of battery which increases the degradation speed of the rechargeable battery. Therefore, it is always important to find the balance between shortening a charging time of a rechargeable battery and prolonging a lifespan of the rechargeable battery for all battery applications. The issue will be how to adjust the charging current to assure that the fully charged capacity of the rechargeable battery is higher than a warranty capacity when the warranty of the rechargeable battery expires. Hereinafter, a novel battery charging scheme/concept related to the rechargeable battery is provided.

FIG. 1 is a schematic diagram of a charging architecture 10 according to an exemplary embodiment of the disclosure. Referring to FIG. 1, the charging architecture 10 includes an electric energy supplying device 101 and a terminal device 103. The electric energy supplying device 101 can be a charger, a portable power or a fuel-cell battery module having at least three functions such as an electric energy output function, an electric energy adjusting function and a communication receiving and decoding function, which is not limited by the disclosure. Moreover, the terminal device 103 can be any device having a rechargeable battery, for example, an electric vehicle or a handheld device (for example, a smart phone, or a tablet computer), though the disclosure is not limited thereto.

In the present exemplary embodiment, the terminal device 103 includes at least a rechargeable battery 105, a battery management module 107 and a charging switch SW. The battery management module 107 can be connected to and communicated with the electric energy supplying device 101 through a wired or wireless manner (for example, USB, RS-232, RS-485, CAN Bus, I2C, WiFi, WiMax, Zegbee, and Bluetooth, though the disclosure is not limited thereto), and further has a function of measuring and checking/detecting electrical parameters (for example, battery information such as voltage, current, temperature, quantity of electricity and internal resistance, etc.) of the rechargeable battery 105.

When the terminal device 103 is connected to the electric energy supplying device 101 due to a need for charge, the battery management module 107 first detects the connected electric energy supplying device 101 through a connection signal. Then, the battery management module 107 communicates with the electric energy supplying device 101, and accordingly controls the electric energy supplying device 101 to set an output charging voltage and current. Thereafter, the battery management module 107 turns on the charging switch SW to connect the electric energy supplying device 101 with the rechargeable battery 105 through terminals (P+, P−), so as to charge the rechargeable battery 105.

Figure 2:
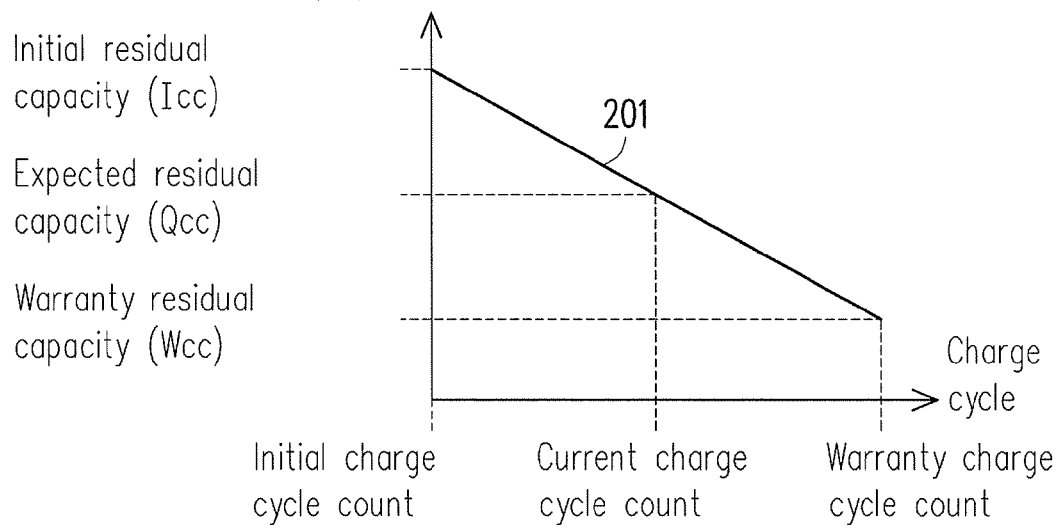
FIG. 2 is a characteristic curve of a rechargeable battery related to charge cycle vs. a residual capacity of a non-constant voltage charging stage under a warranty life limitation that is recorded by a battery management module according to an exemplary embodiment of the disclosure.

In order to ensure that the fully charged capacity of the battery remains higher than the warranty capacity when the warranty of the battery expires, the battery management module 107 records a characteristic curve 201 of the rechargeable battery 105 related to a number of charge cycle vs. a residual capacity of a non-constant voltage charging stage within the warranty life limitation of the rechargeable battery 105 (which is referred to as a charge cycle vs. residual capacity characteristic curve 201 hereinafter), which is illustrated in FIG. 2. An initial (maximum) residual capacity Icc can be attained when the rechargeable battery 105 is charged for the first time (i.e., the first charge of the rechargeable battery after it was manufactured). Moreover, the warranty life limitation of the rechargeable battery 105 may correspond to a warranted charge cycle count or accumulated discharged capacity (for example, 500 times, though the disclosure is not limited thereto), and the warranted charge cycle count may correspond to a warranty residual capacity Wcc when the warranty of the battery expires. Therefore, after the initial residual capacity Icc and the warranty residual capacity Wcc, which are respectively corresponding to the initial charge cycle and the warranted charge cycle count of the rechargeable battery 105, are obtained, a linear (or non-linear) curve can be established between the initial residual capacity Icc and the warranty residual capacity Wcc to serve as the charge cycle vs. residual capacity characteristic curve 201 of the rechargeable battery 105 under the warranty life limitation.

It should be noted that a single charge cycle of the rechargeable battery 105 can be determined according to a charging and discharging behavior of the rechargeable battery 105 or an accumulated discharging capacity. For example, the single charge cycle of the rechargeable battery 105 can be accumulated according to a single charging behavior of the rechargeable battery 105; alternatively, the single charge cycle of the rechargeable battery 105 can be accumulated according to a single discharging behavior of the rechargeable battery 105; alternatively, the single charge cycle of the rechargeable battery 105 can be accumulated as the accumulated total discharging capacity of the rechargeable battery 105 reaches to a predetermined value (for example, when the accumulated discharging capacity of the rechargeable battery 105 reaches 85% of a new battery capacity, then add one to the charge cycle count, though the disclosure is not limited thereto), which is determined according to an actual design or application requirement.

On the other hand, since the battery management module 107 records the charge cycle vs. residual capacity characteristic curve 201 of the rechargeable battery 105 while the rechargeable battery 105 is within the warranty life limitation, which is shown in FIG. 2, the battery management module 107 finds an expected residual capacity Qcc corresponding to a condition when a terminal voltage $V_{TB}$ of the rechargeable battery 105 reaches a limited charging voltage $V_{CV}$ (i.e., a constant voltage required by the rechargeable battery 105 for entering a constant voltage charging stage) from the charge cycle vs. residual capacity characteristic curve 201 by using the current charge cycle count of the rechargeable battery 105, and adjusts a charging current of the rechargeable battery 105 to make a real residual capacity corresponding to the condition when the terminal voltage ($V_{TB}$) of the rechargeable battery reaches the limited charging voltage ($V_{CV}$) to approach to the expected residual capacity (Qcc).

Figure 3:
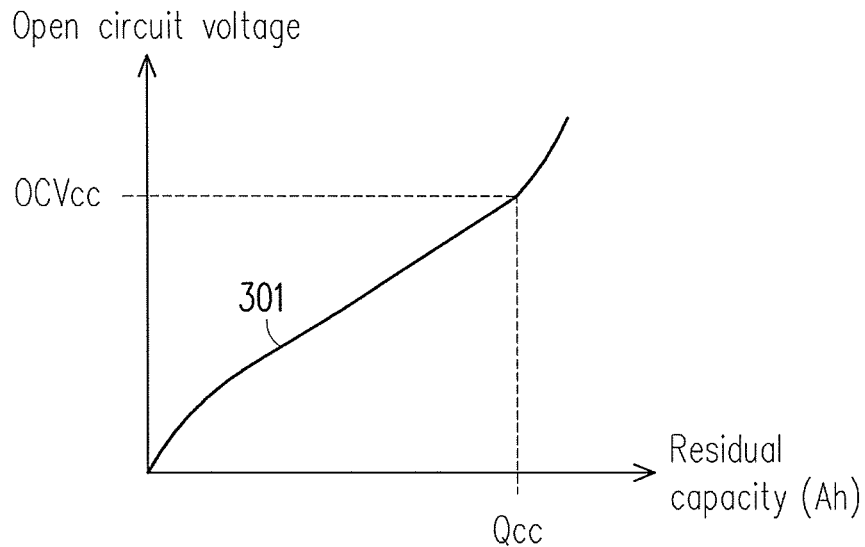
FIG. 3 is a residual capacity vs. open circuit voltage characteristic curve of the rechargeable battery under a no-load state that is recorded by the battery management module according to an exemplary embodiment of the disclosure.

Therefore, the disclosure provides at least two charging current adjusting schemes. One of the charging current adjusting schemes (which is referred to as scheme one) calculates a target voltage difference $\Delta V_T$ between a no-load open circuit voltage (for example, OCVcc shown in FIG. 3) and the limited charging voltage $V_{CV}$ of the rechargeable battery 105 when the non-constant voltage charging stage is ended according to the expected residual capacity Qcc, and dynamically adjust the charging current of the rechargeable battery 105 supplied by the electric energy supplying device 101 in the non-constant voltage charging stage according to the calculated target voltage difference $\Delta V_T$ and a variation of the internal resistance of the rechargeable battery 105. Another charging current adjusting scheme (which is referred to as scheme two) is to adjust/modify the charging current corresponding to a next charge cycle count of the rechargeable battery 105 that is supplied by the electric energy supplying device 101 according to an error ratio of the expected residual capacity and the real residual capacity corresponding to a previous charge cycle count of the rechargeable battery 105.

In an exemplary embodiment of the disclosure, in the scheme one, the current charge cycle count of the rechargeable battery 105 is smaller than or equal to the warranty charge cycle count of the rechargeable battery 105. Moreover, the expected residual capacity Qcc corresponding to the current charge cycle count of the rechargeable battery 105 on the charge cycle vs. residual capacity characteristic curve 201 is greater than or equal to the warranty residual capacity Wcc corresponding to the warranty charge cycle count of the rechargeable battery 105 on the charge cycle vs. residual capacity characteristic curve 201 (Qcc≥Wcc).

Moreover, the limited charge voltage $V_{CV}$ required by the rechargeable battery 105 for entering the constant voltage charging stage (the charging current is greater than 0) is a constant voltage, and the no-load open circuit voltage OCVcc is a battery voltage of the rechargeable battery 105 when the non-constant voltage charging stage is ended (the charging current is equal to 0). Therefore, the limited charge voltage $V_{CV}$ must be greater than the no-load open circuit voltage OCVcc. Under such condition, the battery management module 107 records a residual capacity vs. open circuit voltage characteristic curve 301 of the rechargeable battery 105 shown in FIG. 3 under a no-load state, finds the no-load open circuit voltage OCVcc of the rechargeable battery 105 corresponding to the condition when the non-constant voltage charging stage is ended from the residual capacity vs. open circuit voltage characteristic curve 301 according to the expected residual capacity Qcc, and then the target voltage difference $\Delta V_T$ is obtained by subtracting the no-load open circuit voltage OCVcc from the limited charge voltage $V_{CV}$ (i.e., $\Delta V_T = V_{CV} - OCVcc$), which is shown in FIG. 4.

Once after the battery management module 107 obtains the target voltage difference $\Delta V_T$ through calculation, the battery management module 107 controls the electric energy supplying device 101 according to the obtained target voltage difference $\Delta V_T$ and the variation of the internal resistance of the rechargeable battery 105, and dynamically adjusts the charging current of the rechargeable battery 105 supplied by the electric energy supplying device 101 in the non-constant voltage charging stage.

Figure 4:
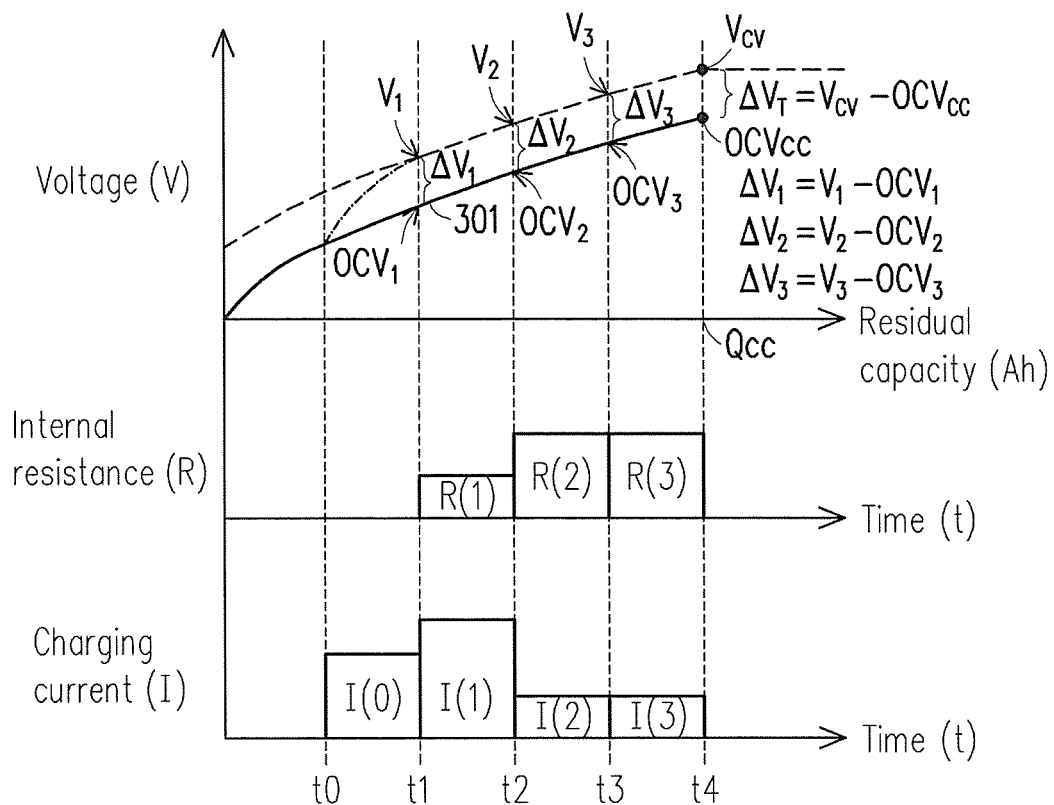
FIG. 4 is a schematic diagram illustrating a process that the battery management module dynamically adjusts a charging current supplied by an electric energy supplying device according to a scheme one.

FIG. 4 is a schematic diagram illustrating a process that the battery management module 107 dynamically adjusts the charging current supplied by the electric energy supplying device 101. According to FIG. 4, at a time t0, the battery management module 107 can control the electric energy supplying device 101 to supply a charging current I(0) to charge the rechargeable battery 105. Between the time t0 and a time t1, which a charging current I(0) is supplied to charge the rechargeable battery 105, the battery management module 107 measures a current terminal voltage $V_1$ of the rechargeable battery 105 and an estimated open circuit voltage $OCV_1$ corresponding to a current residual capacity of the rechargeable battery 105 from the residual capacity vs. open circuit voltage characteristic curve 301, so as to obtain a dynamic voltage difference ($\Delta V_1 = V_1 - OCV_1$). In addition, the battery management module 107 calculates an internal resistance R(1) of the rechargeable battery 105 (i.e., $R(1) = \Delta V_1 / I(0)$) at the time t1 according to the obtained dynamic voltage difference $\Delta V_1$ and the charging current I(0), and then controls the electric energy supplying device 101 to output/supply a charging current I(1) (i.e., $I(1) = \Delta V_T / R(1)$) according to the target voltage difference ($\Delta V_T = V_{CV} - OCVcc$) and the internal resistance R(1) of the rechargeable battery 105. In this way, the electric energy supplying device 101 charges the rechargeable battery 105 by using the charging current I(1) after the time t1.

Similarly, when the electric energy supplying device 101 starts to supply the charging current I(1) to charge the rechargeable battery 105 from the time t1 to a time t2, the battery management module 107 measures a current ten final voltage $V_2$ of the rechargeable battery 105 and an open circuit voltage $OCV_2$ corresponding to the current residual capacity of the rechargeable battery 105 on the residual capacity vs. open circuit voltage characteristic curve 301, so as to obtain a dynamic voltage difference ($\Delta V_2 = V_2 - OCV_2$). In addition, the battery management module 107 calculates an internal resistance R(2) of the rechargeable battery 105 (i.e., $R(2) = \Delta V_2 / I(1)$) at the time t2 according to the obtained dynamic voltage difference $\Delta V_2$ and the charging current I(1), and then controls the electric energy supplying device 101 to output/supply a charging current I(2) (i.e., $I(2) = \Delta V_T / R(2)$) according to the target voltage difference $\Delta V_T$ and the internal resistance R(2) of the rechargeable battery 105. In this way, the electric energy supplying device 101 charges the rechargeable battery 105 by using the charging current I(2) after the time t2.

Similarly, when the electric energy supplying device 101 starts to supply the charging current I(2) to charge the rechargeable battery 105 from the time t2 to a time t3, the battery management module 107 measures a current terminal voltage $V_3$ of the rechargeable battery 105 and an open circuit voltage $OCV_3$ corresponding to the current residual capacity of the rechargeable battery 105 on the residual capacity vs. open circuit voltage characteristic curve 301, so as to obtain a dynamic voltage difference ($\Delta V_3 = V_3 - OCV_3$). In addition, the battery management module 107 calculates an internal resistance R(3) of the rechargeable battery 105 (i.e., $R(3) = \Delta V_3 / I(2)$) at the time t3 according to the obtained dynamic voltage difference $\Delta V_3$ and the charging current I(2), and then controls the electric energy supplying device 101 to output/supply a charging current I(3) (i.e. $I(3) = \Delta V_T / R(3)$) according to the target voltage difference $\Delta V_T$ and the internal resistance R(3) of the rechargeable battery 105. In this way, the electric energy supplying device 101 charges the rechargeable battery 105 by using the charging current I(3) after the time t3.

Therefore, the battery management module 107 calculates the internal resistance R(t) of the rechargeable battery 105 varied along with time (i.e., $I(t) = \Delta V_D / R(t)$, where $\Delta V_D$ is a voltage difference between the terminal voltage and a pre-estimated no-load open circuit voltage during a charging process) while the target voltage difference $\Delta V_T$ ($V_{CV} - OCVcc$) remains constant, so as to dynamically adjust the charging current I(t) of the rechargeable battery 105, which is varied along with time and supplied by the electric energy supplying device 101 during the non-constant voltage charging stage. Moreover, according to FIG. 4, it is known that the charging current I(t) supplied by the electric energy supplying device 101 decreases as the internal resistance R(t) of the rechargeable battery 105 increases; the charging current I(t) supplied by the electric energy supplying device 101 increases as the internal resistance R(t) of the rechargeable battery 105 decreases; and the charging current I(t) supplied by the electric energy supplying device 101 remains unchanged as the internal resistance R(t) of the rechargeable battery 105 is fixed. It should be noted that the reason why the internal resistance R(t) of the rechargeable battery 105 varies along with time may due to the variation in an environment temperature and an aging degree of the rechargeable battery 105, though the disclosure is not limited thereto.

Besides, in other exemplary embodiments of the disclosure, the charging current I(t) supplied by the electric energy supplying device 101 can also be decreased when the internal resistance R(t) of the rechargeable battery 105 is increased to a certain predetermined value (for example, R(t)*(+5%), though the disclosure is not limited thereto); the charging current I(t) supplied by the electric energy supplying device 101 can also be increased when the internal resistance R(t) of the rechargeable battery 105 is decreased to another predetermined value (for example, R(t)*(−5%), though the disclosure is not limited thereto); and the charging current I(t) supplied by the electric energy supplying device 101 can remain unchanged when the internal resistance R(t) of the rechargeable battery 105 is maintained within a predetermined range (for example, R(t)*(±5%), though the disclosure is not limited thereto). Moreover, when a rate of change of a physical parameter such as the internal resistance, the temperature, the charging current or the voltage of the rechargeable battery exceeds a predetermined range, the rechargeable battery is determined to be abnormal, and the charging current of the rechargeable battery is cut off, at the same time alert for battery abnormity is prompted.

When the electric energy supplying device 101 starts to supply the charging current I(3) to charge the rechargeable battery 105 from the time t3 to a time t4, the total electricity stored in the rechargeable battery 105 is equal to the expected residual capacity Qcc corresponding to the current charge cycle count of the rechargeable battery 105 on the charge cycle vs. residual capacity characteristic curve 201. In other words, when the terminal voltage $V_{TB}$ of the rechargeable battery 105 reaches the limited charge voltage $V_{CV}$, the electricity stored therein is the expected residual capacity Qcc.

Figure 5:
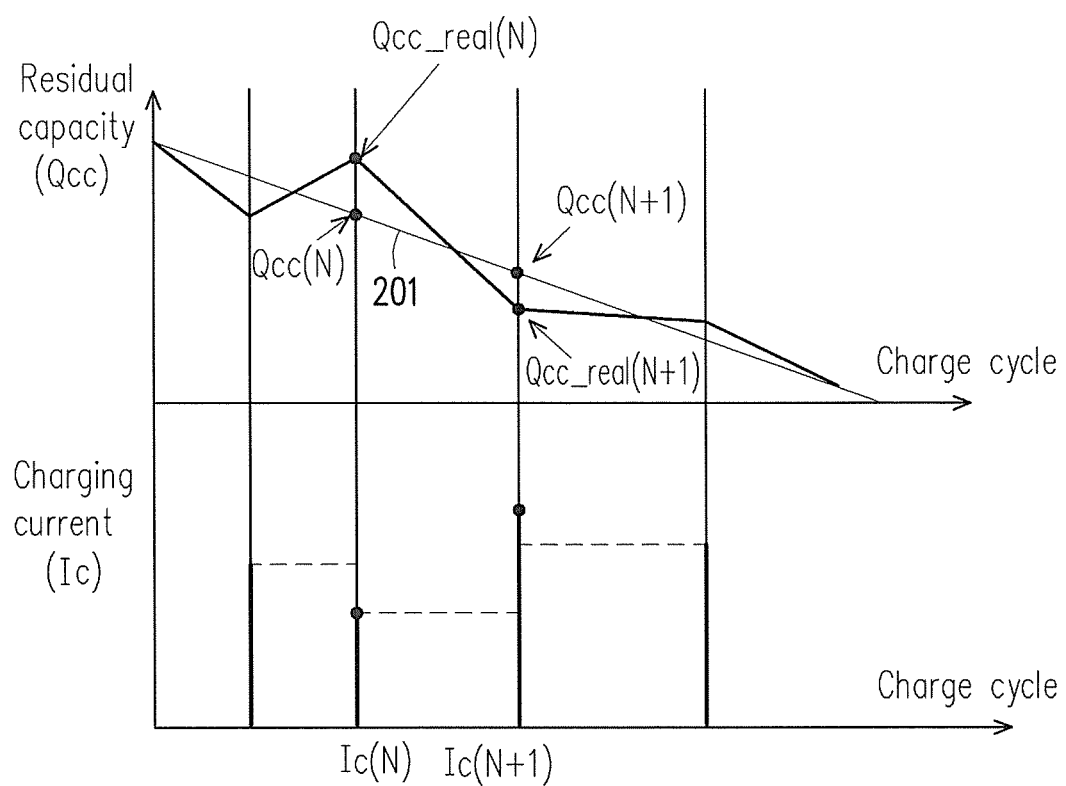
FIG. 5 is a schematic diagram illustrating a process that the battery management module dynamically adjusts the charging current supplied by the electric energy supplying device according to a scheme two.

On the other hand, in the scheme two, the charging current in each non-constant voltage charging stage/process is changed to a constant value, which is regarded as or equivalent to the constant current charging stage/mode. In detail, as shown in FIG. 5, it is assumed that the current charge cycle count of the rechargeable battery 105 is N, the next charge cycle count of the rechargeable battery 105 is N+1, the current charge cycle count N of the rechargeable battery 105 corresponds to a current constant charging current Ic(N), the next charge cycle count N+1 of the rechargeable battery 105 corresponds to a next constant charging current Ic(N+1), and a real residual capacity corresponding to the condition when the terminal voltage $V_{TB}$ of the rechargeable battery 105 reaches the limited charge voltage $V_{CV}$ in response to the current constant charging current Ic(N) is Qcc_real(N), and the expected residual capacity is Qcc(N). Under such condition, an error ratio Qcc_error between the real residual capacity Qcc_real(N) corresponding to the current charge cycle count N of the rechargeable battery 105 and the expected residual capacity Qcc(N) can be represented as Qcc_error=(Qcc_real(N)−Qcc(N))/Qcc(N).

In this way, the battery management module 107 can adjust/modify the next constant charging current Ic(N+1) of the rechargeable battery 105 that is supplied by the electric energy supplying device 101 in the constant current charging stage according to the error ratio Qcc_error between the real residual capacity Qcc_real(N) corresponding to the current charge cycle count N of the rechargeable battery 105 and the expected residual capacity Qcc(N). A feasible method of adjusting/modifying the next constant charging current Ic(N+1) can be: Ic(N+1)=Ic(N)*w*(1+Qcc_error), though the disclosure is not limited thereto, where w is a weight value, and a possible range of the weight value w can be between 0.1-10, though the disclosure is not limited thereto.

Under such condition, when the real residual capacity Qcc_real(N) is greater than the expected residual capacity Qcc(N), the error ratio Qcc_error there between is a positive value. Therefore, the battery management module 107 can control the electric energy supplying device 101 to increase the next constant charging current Ic(N+1). In other words, the next constant charging current Ic(N+1) is greater than the current (previous) constant charging current Ic(N). In the case of the next charge cycle count N+1 of the rechargeable battery 105, the electric energy supplying device 101 supplies a larger charging current Ic(N+1), such that a real residual capacity Qcc_real(N+1) corresponding to the next charge cycle count N+1 of the rechargeable battery 105 is less than the real residual capacity Qcc_real(N) corresponding to the current charge cycle count N of the rechargeable battery 105, and the real residual capacity Qcc_real(N+1) corresponding to the next charge cycle count N+1 of the rechargeable battery 105 may further approach to the expected residual capacity Qcc(N+1) corresponding to the next charge cycle count N+1 of the rechargeable battery 105.

Conversely, when the real residual capacity Qcc_real(N) is smaller than the expected residual capacity Qcc(N), the error ratio Qcc_error there between is a negative value. Therefore, the battery management module 107 can control the electric energy supplying device 101 to decrease the next constant charging current Ic(N+1). In other words, the next constant charging current Ic(N+1) is smaller than the current (previous) constant charging current Ic(N). In the case of the next charge cycle count N+1 of the rechargeable battery 105, the electric energy supplying device 101 supplies a smaller charging current Ic(N+1), such that a real residual capacity Qcc_real(N+1) corresponding to the next charge cycle count N+1 of the rechargeable battery 105 is greater than the real residual capacity Qcc_real(N) corresponding to the current charge cycle count N of the rechargeable battery 105, and the real residual capacity Qcc_real(N+1) corresponding to the next charge cycle count N+1 of the rechargeable battery 105 may further approach to the expected residual capacity Qcc(N+1) corresponding to the next charge cycle count N+1 of the rechargeable battery 105.

In this way, the charging current adjusting scheme (i.e. the scheme one) executed by the battery management module 107 may fall on the charge cycle vs. residual capacity characteristic curve 201, so as to control the electric energy supplying device 101 to charge the rechargeable battery 105. Alternatively, the charging current adjusting scheme (i.e. the scheme two) executed by the battery management module 107 may fall within a plus and minus interval range (for example, ±5%, though the disclosure is not limited thereto) of the charge cycle vs. residual capacity characteristic curve 201, so as to control the electric energy supplying device 101 to charge the rechargeable battery 105. It should be noted that the battery management module 107 may respectively use the two charging current adjusting schemes corresponding to the scheme one and the scheme two, or use both of the two charging current adjusting schemes corresponding to the scheme one and the scheme two to achieve a better tracking effect.

Moreover, regardless of the scheme one or the scheme two, when the terminal voltage $V_{TB}$ of the rechargeable battery 105 reaches the limited charge voltage $V_{CV}$, the battery management module 107 is changed from a non-constant voltage charging mode (scheme one)/constant current charging mode (scheme two) into a constant voltage charging mode, so as to control the electric energy supplying device 101 to provide a charging voltage having a fixed value (i.e. a constant voltage) as well as complying with the limited charge voltage $V_{CV}$ to the rechargeable battery 105. In this way, the electric energy supplying device 101 charges the rechargeable battery 105 through a manner of constant voltage, and charges the rechargeable battery 105 to a state close to 100% capacity.

According to the above descriptions, it is known that since the battery management module 107 records the charge cycle vs. residual capacity characteristic curve 201 of the rechargeable battery 105 under the warranty life limitation, and the current charge cycle count of the rechargeable battery 105 is set to be smaller than or equal to the warranty charge cycle count corresponding to the warranty life limitation of the rechargeable battery 105, the battery management module 107 can: (1) adjust the charging current I(t) provided by the electric energy supplying device 101 according to the target voltage difference $\Delta V_T = V_{CV} - OCVcc$ of the constant value and the variation of the internal resistance of the rechargeable battery 105 obtained under the present charge cycle; and/or (2) adjust the next constant charging current Ic(N+1) provided by the electric energy supplying device 101 according to the error ratio Qcc_error between the expected residual capacity Qcc(N) corresponding to the previous charge cycle count (N) of the rechargeable battery 105 and the real residual capacity Qcc_real(N), so that the rechargeable battery 105 can still satisfy the warranty capacity of the battery when the warranty of the battery expires, so as to attain a balance between shortening the charging time of the rechargeable battery 105 and prolonging the lifespan of the rechargeable battery 105.

It should be noted that the battery management module 107 can be implemented in a hardware which is called battery management system (BMS) circuit or in application software (APP) which is composed of functions of embedded operation system. The implementation of the battery management module 107 can be determined according to an actual design or application requirement. If the battery management module 107 is implemented by the application software, it means that most hardware and computing capacity for controlling the charging current I(t) are already build-in on the terminal device 103 (such as a smart phone). Therefore, the goal of adjusting the electric energy supplying device 101 can be implemented by installing the APP to terminal device 103.

Figure 6:
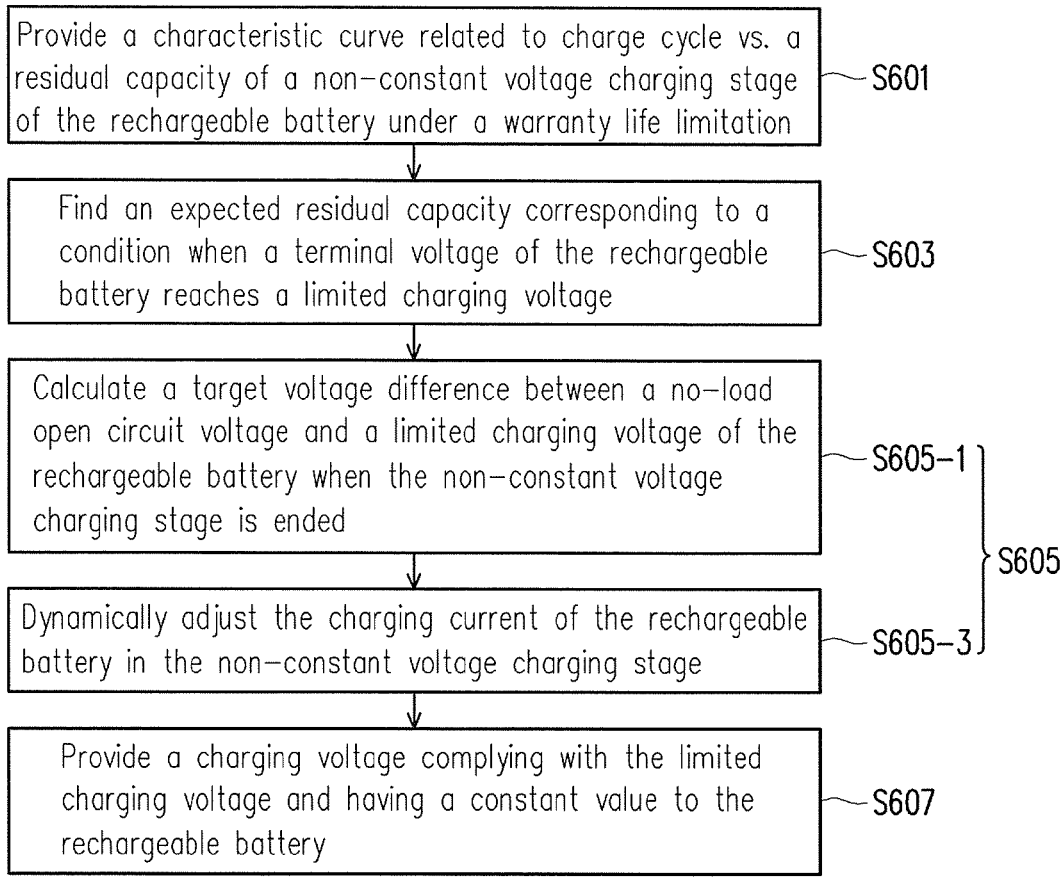
FIG. 6 is a flowchart illustrating a charging method for a rechargeable battery according to an exemplary embodiment of the disclosure.

Based on the disclosure/instruction of the aforementioned exemplary embodiment, FIG. 6 is a flowchart illustrating a charging method for a rechargeable battery according to an exemplary embodiment of the disclosure. Referring to FIG. 6, the charging method for the rechargeable battery of the present exemplary embodiment includes following steps.

A characteristic curve of the rechargeable battery related to charge cycle vs. a residual capacity of a non-constant voltage charging stage under a warranty life limitation is provided (step S601).

An expected residual capacity corresponding to a condition when a terminal voltage of the rechargeable battery reaches a limited charge voltage is found from the provided characteristic curve related to the charge cycle vs. the residual capacity of the non-constant voltage charging stage by using a current charge cycle count of the rechargeable battery (step S603).

A real residual capacity corresponding to the condition when the terminal voltage of the rechargeable battery reaches the limited charge voltage approaches to the expected residual capacity by adjusting a charging current of the rechargeable battery (step S605), and in the step S605, a method/scheme for adjusting the rechargeable battery includes following steps.

A target voltage difference of the rechargeable battery between a no-load open circuit voltage and the limited charge voltage when the non-constant voltage charging stage is ended is calculated according to the expected residual capacity (step S605-1).

The charging current of the rechargeable battery in the non-constant voltage charging stage is dynamically adjusted according to the calculated target voltage difference and the variation of the internal resistance of the rechargeable battery (step S605-2).

In the constant voltage charging stage after the non-constant voltage charging stage, a charging voltage having a constant value as well as complying with the limited charge voltage is provided to the rechargeable battery (step S607).

Similar to the aforementioned exemplary embodiment, the warranty life limitation of the rechargeable battery may correspond to a warranty charge cycle count, and the current charge cycle count of the rechargeable battery mentioned in the step S603 is smaller than or equal to the warranty charge cycle count. Moreover, the warranty charge cycle count of the rechargeable battery may correspond to a warranty residual capacity on the characteristic curve related to the charge cycle vs. the residual capacity of the non-constant voltage charging stage provided in the step S601, and the expected residual capacity found in the step S603 is greater than or equal to the warranty residual capacity.

Figure 7:
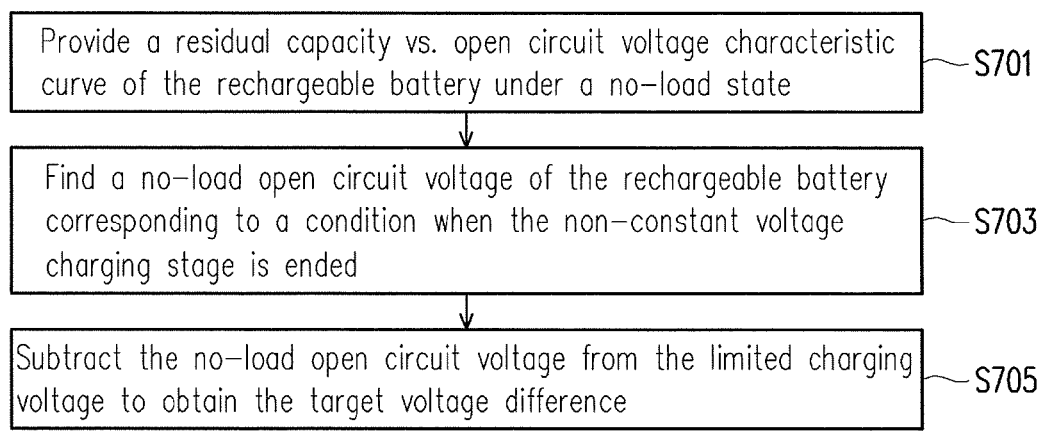
FIG. 7 is a flowchart illustrating a method for calculating a target voltage difference $\Delta V_T$ in FIG. 6.

Similar to the aforementioned exemplary embodiment, since the limited charge voltage mentioned in the step S605{S605-1,S605-3} is greater than the no-load open circuit voltage of the rechargeable battery when the non-constant voltage charging stage is ended, the step of calculating the target voltage difference in the step S605{S605-1,S605-3} may include the following steps as that shown in FIG. 7.

A residual capacity vs. open circuit voltage characteristic curve of the rechargeable battery under a no-load state is provided (step S701).

The no-load open circuit voltage of the rechargeable battery corresponding to a condition when the non-constant voltage charging stage is ended is found from the residual capacity vs. open circuit voltage characteristic curve according to the expected residual capacity (step S703).

The no-load open circuit voltage found in the step S703 is subtracted from the limited charge voltage to obtain the target voltage difference (step S705).

Similar to the aforementioned exemplary embodiment, the obtained target voltage difference is a fixed voltage difference (i.e. constant value) in the current charging process. Moreover, the charging current adjusted in the step S605 may be (1) decreased as the internal resistance of the rechargeable battery is increased (or decreased when the internal resistance is increased to a certain predetermined value); (2) increased as the internal resistance of the rechargeable battery is decreased (or decreased when the internal resistance is decreased to another predetermined value); (3) remain unchanged when the internal resistance of the rechargeable battery is fixed (or remain unchanged when the internal resistance of the rechargeable battery is maintained within a predetermined range); and (4) when a rate of change of a physical parameter such as the internal resistance, the temperature, the charging current or the voltage exceeds a predetermined range, the rechargeable battery is determined to be abnormal, and the charging current is cut off to avoid failure of the battery.

Figure 8:
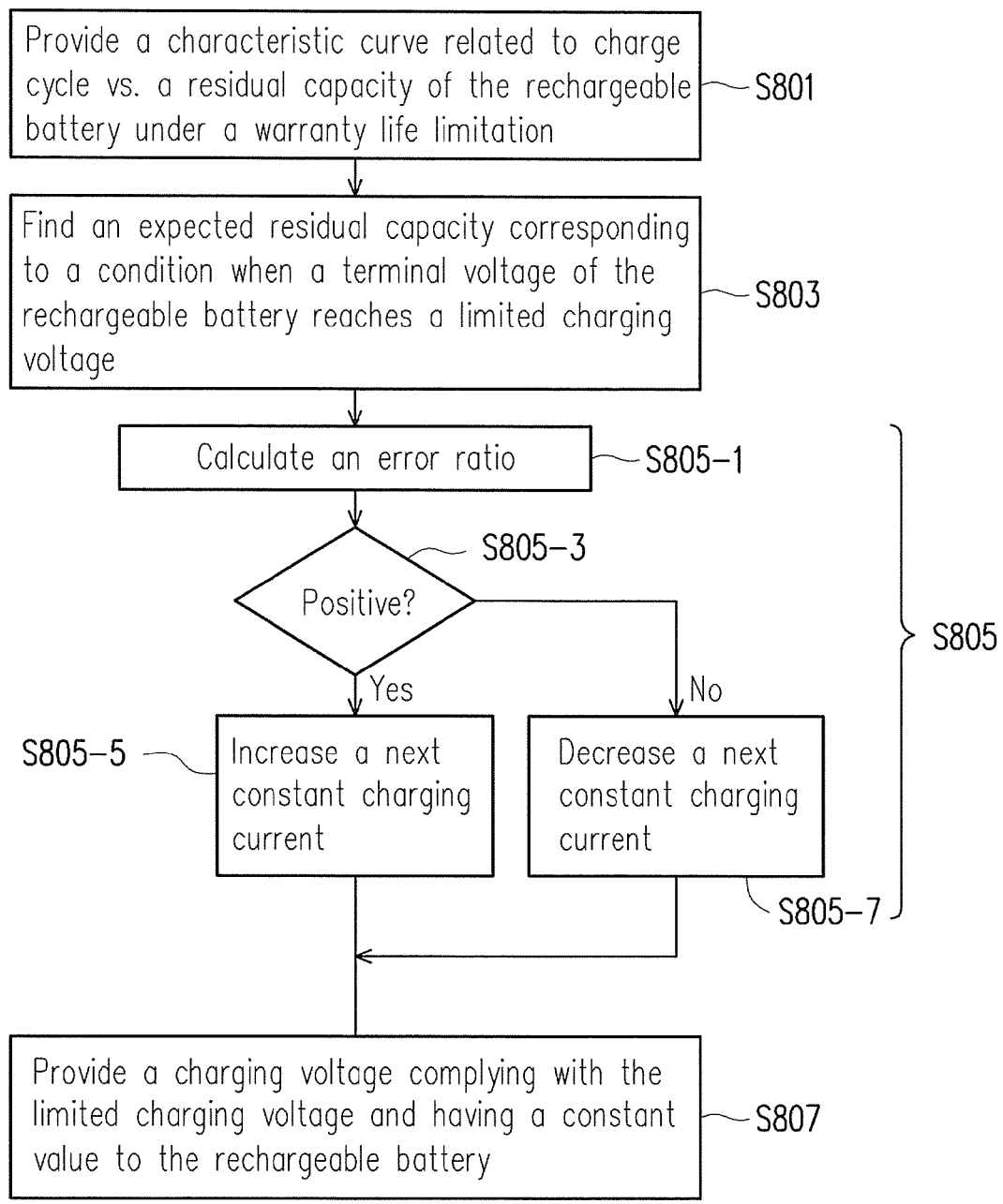
FIG. 8 is a flowchart illustrating a charging method for a rechargeable battery according to another exemplary embodiment of the disclosure.

Besides, FIG. 8 is a flowchart illustrating a charging method of a rechargeable battery according to another exemplary embodiment of the disclosure. Referring to FIG. 8, the charging method of the rechargeable battery of the present exemplary embodiment includes the following steps.

A characteristic curve of the rechargeable battery related to a charge cycle vs. a residual capacity of a non-constant voltage charging stage under a warranty life limitation is provided (step S801).

An expected residual capacity corresponding to a condition when a terminal voltage of the rechargeable battery reaches a limited charge voltage is found from the provided characteristic curve related to the charge cycle vs. the residual capacity of the non-constant voltage charging stage by using a current charge cycle count of the rechargeable battery (step S803).

A real residual capacity corresponding to a condition when the terminal voltage of the rechargeable battery reaches the limited charge voltage approaches to the expected residual capacity by adjusting a charging current of the rechargeable battery (step S805). In the step S805, the current charge cycle count of the rechargeable battery corresponds to a current constant charging current, a next charge cycle count of the rechargeable battery corresponds to a next constant charging current, and a real residual capacity corresponding to the condition when the terminal voltage of the rechargeable battery reaches the limited charge voltage in response to the current constant charging current is the current real residual capacity, so that a method/scheme of adjusting the charging current is to adjust the next constant charging current of the rechargeable battery in the constant current charging stage according to an error ratio between the current real residual capacity and the expected residual capacity. In detail, the method/scheme for adjusting the rechargeable battery may include the following steps.

An error ratio between the current real residual capacity and the expected residual capacity is calculated (step S805-1).

It is determined whether the calculated error rate is a positive value (step S805-3).

When it is determined that the error rate is the positive value, the next constant charging current of the rechargeable battery in the constant current charging stage is increased (step S805-5).

When it is determined that the error rate is the negative value, the next constant charging current of the rechargeable battery in the constant current charging stage is decreased (step S805-7).

In the constant voltage charging stage after the constant current charging stage, a charging voltage having a constant value as well as complying with the limited charge voltage is provided to the rechargeable battery (step S807).

In brief, the charging current adjusting method/scheme instructed in the exemplary embodiment of FIG. 8 is to modify/adjust the current charging current so as to obtain a next charging current setting value according to an error ratio between the real residual capacity and the expected residual capacity while the current constant charging current is charged to the limited charge voltage, so that the real residual capacity approaches the expected residual capacity by adjusting the charging current corresponding to each charging cycle times.

In summary, according to the charging architecture and the charging method of the rechargeable battery provided by the disclosure, the rechargeable battery may still reach the corresponding warranty residual capacity in the warranty life limitation, so as to attain a balance between shortening the charging time of the rechargeable battery and prolonging of a lifespan of the rechargeable battery.

It will be apparent to those skilled in the art that various modifications and variations can be made to the architecture of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A charging method of a rechargeable battery, comprising:
    providing a characteristic curve of the rechargeable battery related to charge cycle vs. a residual capacity of a non-constant voltage charging stage under a warranty life limitation;
    finding an expected residual capacity corresponding to a condition when a terminal voltage of the rechargeable battery reaches a limited charge voltage from the characteristic curve related to the charge cycle vs. the residual capacity of the non-constant voltage charging stage by using a current charge cycle count of the rechargeable battery; and
    making a real residual capacity corresponding to a condition when the terminal voltage of the rechargeable battery reaches the limited charge voltage to approach to the expected residual capacity by adjusting a charging current of the rechargeable battery.

2. The charging method of the rechargeable battery as claimed in claim 1, wherein the step of adjusting the charging current comprises:
    calculating a target voltage difference of the rechargeable battery between a no-load open circuit voltage and the limited charge voltage when the non-constant voltage charging stage is ended according to the expected residual capacity; and
    adjusting the charging current of the rechargeable battery in the non-constant voltage charging stage dynamically according to the target voltage difference and variation of an internal resistance of the rechargeable battery.

3. The charging method of the rechargeable battery as claimed in claim 1, wherein
    the warranty life limitation corresponds to a warranty charge cycle count, and the current charge cycle count is smaller than or equal to the warranty charge cycle count, and
    the warranty charge cycle count corresponds to a warranty residual capacity on the characteristic curve related to the charge cycle vs. the residual capacity of the non-constant voltage charging stage, and the expected residual capacity is greater than or equal to the warranty residual capacity.

4. The charging method of the rechargeable battery as claimed in claim 2, wherein the limited charge voltage is greater than the no-load open circuit voltage, and the step of calculating the target voltage difference comprises:
    providing a residual capacity vs. open circuit voltage characteristic curve of the rechargeable battery under a no-load state;
    finding the no-load open circuit voltage of the rechargeable battery corresponding to a condition when the non-constant voltage charging stage is ended from the residual capacity vs. open circuit voltage characteristic curve according to the expected residual capacity; and
    subtracting the no-load open circuit voltage from the limited charge voltage to obtain the target voltage difference.

5. The charging method of the rechargeable battery as claimed in claim 2, wherein
    the target voltage difference is a constant value;
    the charging current is decreased as the internal resistance of the rechargeable battery is increased;
    the charging current is increased as the internal resistance of the rechargeable battery is decreased;
    the charging current is maintained unchanged when the internal resistance of the rechargeable battery is fixed; and
    when a rate of change of the internal resistance, a temperature, the charging current or a voltage of the rechargeable battery exceeds a predetermined range, the rechargeable battery is determined to be abnormal, and the charging current is cut off.

6. The charging method of the rechargeable battery as claimed in claim 2, wherein
the target voltage difference is a constant value;
the charging current is decreased as the internal resistance of the rechargeable battery is increased to a predetermined value;
the charging current is increased as the internal resistance of the rechargeable battery is decreased to another predetermined value;
the charging current is maintained unchanged when the internal resistance of the rechargeable battery is maintained within a predetermined range; and
when a rate of change of the internal resistance, a temperature, the charging current or a voltage of the rechargeable battery exceeds another predetermined range, the rechargeable battery is determined to be abnormal, and the charging current is cut off.

7. The charging method of the rechargeable battery as claimed in claim 2, further comprising:
providing a charging voltage complying with the limited charge voltage and having a constant value to the rechargeable battery in a constant voltage charging stage after the non-constant voltage charging stage.

8. The charging method of the rechargeable battery as claimed in claim 1, wherein the current charge cycle count of the rechargeable battery corresponds to a current constant charging current, a next charge cycle count of the rechargeable battery corresponds to a next constant charging current, and the real residual capacity corresponding to a condition when the terminal voltage of the rechargeable battery reaches the limited charge voltage in response to the current constant charging current is a current real residual capacity, the step of adjusting the charging current comprises:
adjusting the next constant charging current of the rechargeable battery in a constant current charging stage according to an error ratio between the current real residual capacity and the expected residual capacity.

9. The charging method of the rechargeable battery as claimed in claim 8, wherein
when the error rate is a positive value, the next constant charging current is increased; and
when the error rate is a negative value, the next constant charging current is decreased.

10. The charging method of the rechargeable battery as claimed in claim 8, further comprising:
providing a charging voltage complying with the limited charge voltage and having a constant value to the rechargeable battery in a constant voltage charging stage after the non-constant voltage charging stage.

11. A charging architecture, comprising:
an electric energy supplying device; and
a terminal device, comprising:
a rechargeable battery; and
a battery management module, connected to and communicating with the electric energy supplying device, wherein the battery management module is configured to: record a characteristic curve of the rechargeable battery related to charge cycle vs. a residual capacity of a non-constant voltage charging stage under a warranty life limitation; find an expected residual capacity corresponding to a condition when a terminal voltage of the rechargeable battery reaches a limited charge voltage from the characteristic curve related to the charge cycle vs. the residual capacity of the non-constant voltage charging stage by using a current charge cycle count of the rechargeable battery; and adjust a charging current of the rechargeable battery to make a real residual capacity corresponding to a condition when the terminal voltage of the rechargeable battery reaches the limited charge voltage to approach to the expected residual capacity.

12. The charging architecture as claimed in claim 11, wherein the battery management module calculates a target voltage difference of the rechargeable battery between a no-load open circuit voltage and the limited charge voltage when a non-constant voltage charging stage is ended according to the expected residual capacity; and controls the electric energy supplying device according to the target voltage difference and variation of an internal resistance of the rechargeable battery, and dynamically adjusts the charging current of the rechargeable battery supplied by the electric energy supplying device in the non-constant voltage charging stage.

13. The charging architecture as claimed in claim 11, wherein
the warranty life limitation corresponds to a warranty charge cycle count, and the current charge cycle count is smaller than or equal to the warranty charge cycle count, and
the warranty charge cycle count corresponds to a warranty residual capacity on the characteristic curve related to the charge cycle vs. the residual capacity of the non-constant voltage charging stage, and the expected residual capacity is greater than or equal to the warranty residual capacity.

14. The charging architecture as claimed in claim 12, wherein the limited charge voltage is greater than the no-load open circuit voltage, and the battery management module records a residual capacity vs. open circuit voltage characteristic curve of the rechargeable battery under a no-load state; finds the no-load open circuit voltage of the rechargeable battery corresponding to a condition when the non-constant voltage charging stage is ended from the residual capacity vs. open circuit voltage characteristic curve according to the expected residual capacity; and subtracts the no-load open circuit voltage from the limited charge voltage to obtain the target voltage difference.

15. The charging architecture as claimed in claim 12, wherein
the target voltage difference is a constant value;
the charging current is decreased as the internal resistance of the rechargeable battery is increased;
the charging current is increased as the internal resistance of the rechargeable battery is decreased;
the charging current is maintained unchanged when the internal resistance of the rechargeable battery is fixed; and
when a rate of change of the internal resistance, a temperature, the charging current or a voltage of the rechargeable battery exceeds a predetermined range, the rechargeable battery is determined to be abnormal, and the charging current is cut off.

16. The charging architecture as claimed in claim 12, wherein
the target voltage difference is a constant value;
the charging current is decreased as the internal resistance of the rechargeable battery is increased to a predetermined value;
the charging current is increased as the internal resistance of the rechargeable battery is decreased to another predetermined value;
the charging current is maintained unchanged when the internal resistance of the rechargeable battery is maintained within a predetermined range; and when a rate of change of the internal resistance, a temperature, the charging current or a voltage of the rechargeable battery exceeds another predetermined range, the rechargeable battery is determined to be abnormal, and the charging current is cut off.

17. The charging architecture as claimed in claim 12, wherein the battery management module is further configured to control the electric energy supplying device to provide a charging voltage complying with the limited charge voltage and having a constant value to the rechargeable battery in a constant voltage charging stage after the non-constant voltage charging stage.

18. The charging architecture as claimed in claim 11, wherein the current charge cycle count of the rechargeable battery corresponds to a current constant charging current, a next charge cycle count of the rechargeable battery corresponds to a next constant charging current, and the real residual capacity corresponding to a condition when the terminal voltage of the rechargeable battery reaches the limited charge voltage in response to the current constant charging current is a current real residual capacity, and the battery management module controls the electric energy supplying device according to an error ratio between the current real residual capacity and the expected residual capacity, and adjusts the next constant charging current of the rechargeable battery supplied by the electric energy supplying device in a constant current charging stage.

19. The charging architecture as claimed in claim 18, wherein
when the error rate is a positive value, the battery management module controls the electric energy supplying device to increase the next constant charging current, and
when the error rate is a negative value, the battery management module controls the electric energy supplying device to decrease the next constant charging current.

20. The charging architecture as claimed in claim 11, wherein the battery management module is a battery management system of a hardware type.

21. The charging architecture as claimed in claim 11, wherein the battery management module is a battery management application of a software type.

* * * * *